Dec. 17, 1963    R. S. THRELKELD    3,114,228
MOWING MACHINE
Filed June 2, 1961    2 Sheets-Sheet 1
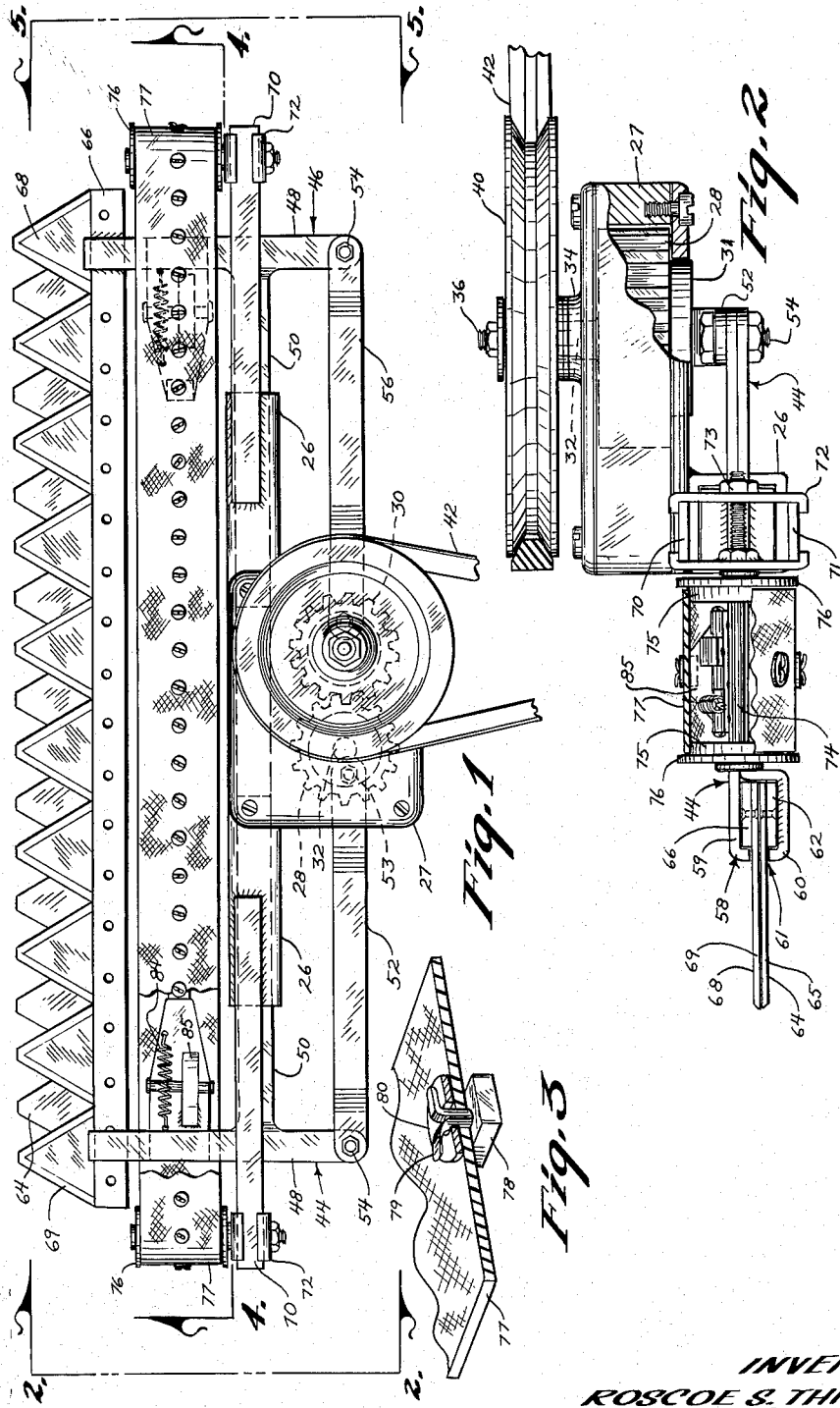
INVENTOR
ROSCOE S. THRELKELD
WITNESS
NORMAN G. TRAVISS
BY
Talbert Dick & Farley
ATTORNEYS Dec. 17, 1963 R. S. THRELKELD 3,114,228
MOWING MACHINE
Filed June 2, 1961 2 Sheets-Sheet 2
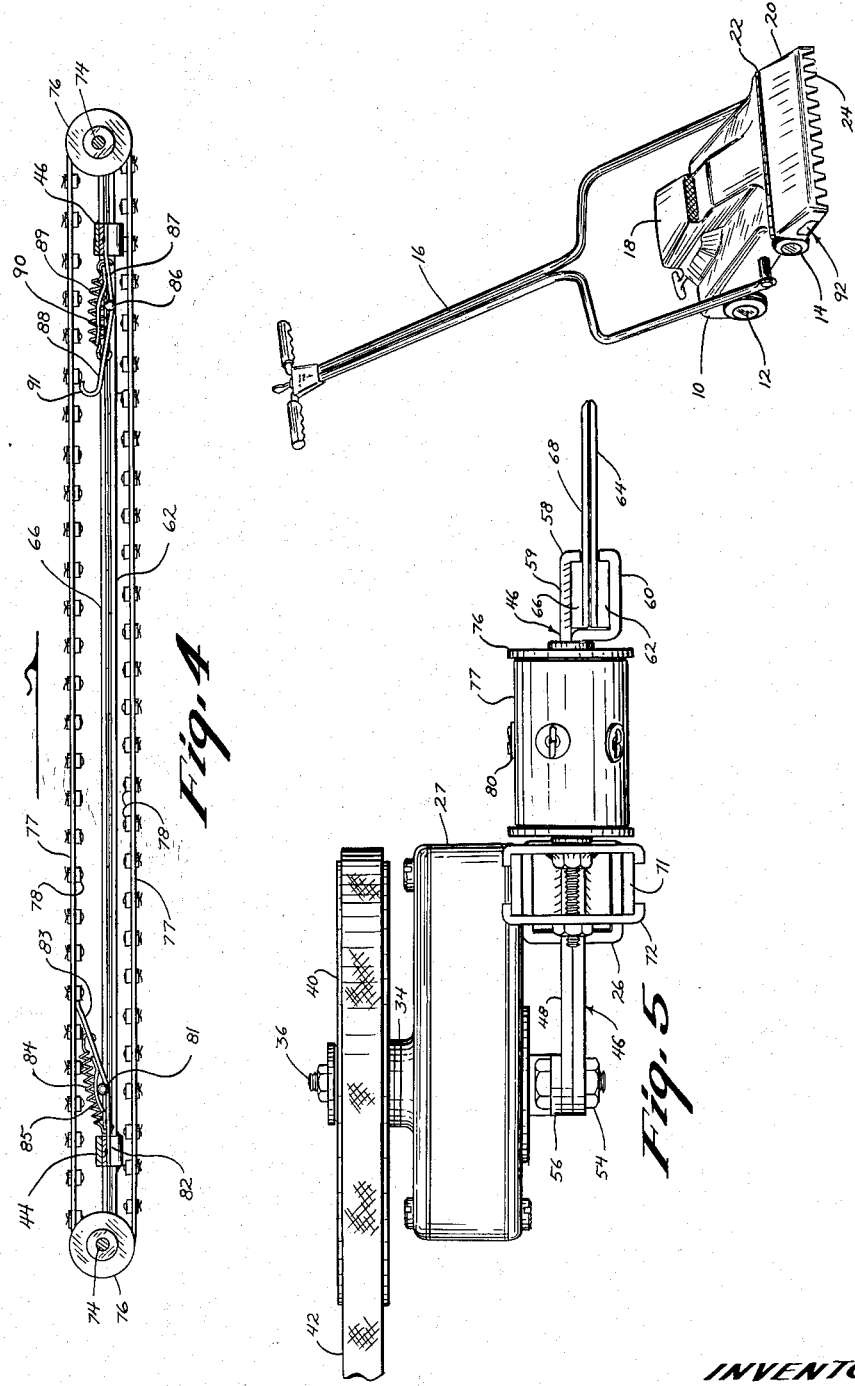
WITNESS
NORMAN G. TRAVISS
INVENTOR
ROSCOE S. THRELKELD
BY Talbert Dick & Farley
ATTORNEYS

United States Patent Office 3,114,228
Patented Dec. 17, 1963

3,114,228
MOWING MACHINE
Roscoe S. Threlkeld, Box 235, Maxwell, Iowa
Filed June 2, 1961, Ser. No. 114,545
2 Claims. (Cl. 56—23)

My invention relates to mowing machines and more particularly to the cutting mechanism of such a device.

Mowing machines with high speed rotary cutting blades present a hazard to the machine operator and those in the surrounding area because debris, and sometimes the cutting blades themselves, are hurled from the cutting area underneath the machine. Reel and bar-type mowers present less danger, in this connection, but both of these latter devices have inherent shortcomings. The reel-type mower has difficulty cutting tall grass, and the conventional bar-type mower does not normally obtain a fine cut for lawn purposes and some difficulty in disposing of the cut material is also experienced.

Therefore, the principal object of my invention is to provide a bar-type mowing machine that will operate its cutting blades at a relatively slower speed but which will accomplish an improved cutting action.

A further object of my invention is to provide bar-type mowing machines with means to remove the cut material from the area of the cutting mechanism.

A still further object of my invention is to provide a bar-type mowing machine that is safe to operate and maintain.

A still further object of my invention is to provide a bar-type mowing machine that is self-sharpening.

A still further object of my invention is to provide a bar-type mowing machine that is economical of manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a partial plan view of the cutting mechanism of my device with portions thereof cut away to more fully show its construction;

FIG. 2 is an enlarged partial elevational view of the cutting mechanism taken on line 2—2 of FIG. 1. Segments of FIG. 2 have been cut away to more fully illustrate the construction thereof;

FIG. 3 is an enlarged perspective view of my belt device with a portion of the belt cut away to more fully illustrate its construction;

FIG. 4 is a sectional view of my device taken on line 4—4 of FIG. 1, and shows the drive mechanism for the belt element;

FIG. 5 is an enlarged elevational view of my device taken on line 5—5 of FIG. 1; and FIG. 6 is a perspective view of my device drawn to a reduced scale.

I have used the numeral 10 to generally designate a mower frame supported by rear wheels 12 and from wheels 14. Handle 16 is pivotally secured to frame 10 in conventional fashion. Motor 18 is mounted on the top of frame 10 and is equipped with a conventional vertical drive shaft (not shown) with a horizontally disposed V-belt pulley thereon. A shield 20 is pivotally secured to the forward end of frame 10 by hinge 22. This shield is shown in its normal position in FIG. 6 but can be pivoted upwardly so that access can be had to the cutting mechanism. A plurality of spaced apart guard teeth 24 on the forward lower portion of shield 20 prevents debris from entering the cutting area.

A hollow tube 26 which is substantially square in cross section is secured to the forward end of frame 10 underneath shield 20 in any convenient fashion such as by welding or the like. A rectangular sealed gear box 27 is welded by its forward bottom portion to the center of tube 26 as shown in FIGS. 2 and 5. Two identical gears 28 and 30 are meshed and are rotatably mounted within gear box 27. Each gear has a shoulder 31 on its lower face which is journaled in an aperture of complementary size in the bottom of the gear box, as shown in FIG. 2. A stud shaft 32 extends upwardly from the center of gear 28 and is journaled in bearing 34. Shaft 36 extends upwardly from the center of gear 30, through bearing 38 in gear box 27, and terminates at a point above the gear box to rigidly receive horizontal pulley wheel 40. Pulley wheel 40 is connected to the pulley wheel on the drive shaft of the motor 18 by V-belt 42.

T-shaped bars 44 and 46 with crossbars 48 and shank 50 have their respective shanks slidably inserted in the opposite ends of tube 26. The shanks 50 of the bars 44 and 46 are square in cross section to complement the shape of the hollow tube 26. Elongated arm 52 has one of its ends pivotally secured to the bottom of shoulder 31 on gear 28 by pin 53, as shown in FIGS. 1 and 2. It should be noted that pin 53 is eccentrically located on gear 28. The other end of arm 52 is pivotally secured to the rearward end of crossbar 48 on T-shaped bar 44, by means of bolt and nut assembly 54. Arm 56 has its respective ends pivotally secured to gear 30 and T-shaped bar 46 in the same fashion as arm 52 was secured to gear 28 and T-shaped bar 44, and this is accomplished by pin 53 and bolt and nut assembly 54 in the opposite ends of arm 56. The pin 53 on gear 30 is eccentrically mounted thereon in the same manner that the pin 53 was mounted on gear 28. FIG. 1 shows the relationship of the two gears and the manner in which the arms 52 and 56 are eccentrically secured to the respective gears.

As shown in FIGS. 2 and 5, the forward ends of the T-shaped bars are formed to create rectangular bearings 58 with an upper portion 59, a lower portion 60, and a slot opening 61 on the forward side thereof. An elongated bar 62 extends between and is supported in the lower portions 60 of the tow bearings 58. One end of bar 62 is welded to the bearing on T-shaped bar 44, and the other end of bar 62 slidably engages the bearing on T-shaped bar 46. A plurality of triangularly-shaped cutting teeth 64 are secured to bar 62 and extend forwardly therefrom. The cutting edges 65 of teeth 64 are tapered upwardly and outwardly.

An elongated bar 66 is similar to bar 62 and also has a plurality of cutting teeth 68 secured thereto. Bar 66 is journaled in the upper portion of bearings 58 as shown in FIGS. 2 and 5 and the teeth 68 thereon are slidably supported on the teeth 64 of bar 62. The cutting edges 69 of teeth 68 are tapered downwardly and outwardly and are alternately positioned with respect to the teeth 64 when the arms 52 and 56 are in the position shown in FIG. 1. Bar 66 has one of its ends welded to the upper portion of the bearing 58 on T-shaped bar 46, and the other end of bar 66 slidably engages the bearing on T-shaped bar 44.

Two bars 70 and 71 are welded to the top and bottom, respectively, of the tube 26 at each end thereof. Bars 70 and 71 extend beyond the ends of tube 26 to a point beyond the positions of T-shaped bars 44 and 46. Clip brackets 72 are slidably adjustably secured to the outer ends of each pair of bars 70 and 71 by means of nut and bolt assemblies 73. Shafts 74 extend forwardly from brackets 72 and rollers 75 are rotatably mounted thereon.

Rollers 75 have flanges 76 at each end to keep the continuous belt 77 which extends between and around the two rollers from riding off the belt-bearing surface thereof. Rectangular lugs 78 are secured in spaced relation to the interior centerline of belt 77 by means of pins 79 and washers 80, as shown in FIG. 3.

A hinge 81 has one of its leaves 82 welded to the crossbar 48 of T-shaped bar 44. The other leaf 83 of the hinge 81 is normally urged upwardly into yielding engagement with belt 77 and lugs 78 by means of spring 84 which is under tension and which is connected in any convenient manner by its ends to the two respective leaves. A stop element 85 is welded to leaf 82 and engages leaf 83 to limit the pivotal movement between the leaves which is urged by spring 84. As shown in FIG. 4, the free end of leaf 83 is capable of entering into abutting engagement with one of the lugs 78 at times.

A hinge 86 has one of its leaves 87 welded to the crossbar 48 of T-shaped bar 46. The other leaf 88 of hinge 86 is normally urged upwardly into yielding engagement with belt 77 and lugs 78 by means of spring 89 which is under tension and which is connected in any convenient manner by its ends to the two respective leaves. A stop element 90 is welded to leaf 87 and engages leaf 88 to limit the pivotal movement between the leaves which is urged by spring 89. A hook 91 is formed on the free end of leaf 88 so that leaf 88 can engage lugs 78 at times to pull the belt in one direction.

The normal operation of my device is as follows: As the motor 18 causes V-belt 42 and pulley 40 to rotate, rotational motion is imparted to gear 30 through shaft 36. This causes the meshing gears 28 and 30 to rotate in opposite directions, and causes the gears to move the adjacent ends of arms 52 and 56 toward each other. This movement of arms 52 and 56 in turn causes the T-shaped bars 44 and 46 to slidably move toward each other in tube 26. Since one end of cutting bar 62 is welded to T-shaped bar 44, and the one end of cutting bar 66 is welded to T-shaped bar 46, the two bars and the cutting teeth thereof slide over each other as the two T-shaped bars move toward each other. As soon as the gears 28 and 30 have rotated just over one hundred and eighty degrees from the position shown in FIG. 1, the inner ends of arms 52 and 56 begin to move away from each other which causes an immediate and similar action between the two T-shaped bars. This reverses the sliding direction of displacement of the two cutting bars 62 and 66 but the shearing cutting action of the two cutting bars is retained even though their respective directions of travel are alternately reversed. Any wearing of the cutting edges 69 and 65 of the two sets of cutting teeth will not dull the cutting edges because the tapered shapes thereof will always retain their sharpness. Since both cutting bars 62 and 66 move with respect to each other, the speed of displacement can be half that of the case where only one of the two cutting bars moves over a second stationary bar.

By viewing FIG. 4, it is seen that as T-shaped bars 44 and 46 move toward each other, the leaf 83 of hinge 81 will engage one of the lugs 78 on belt 77 and urge the top portion of the belt to the right. At the same time, leaf 88 will ride over the lugs 78 on the belt as the hinge is moved to the left by T-shaped bar 46. When the T-shaped bars 44 and 46 then begin to pull the two hinges 81 and 86 away from each other, the hook 91 on the hinge 86 will thereupon move to the right, as viewed in FIG. 4, and will engage one of the lugs 78 to continue the movement of the upper portion of the belt to the right. As hinge 81 moves to the left, leaf 83 will be permitted to ride over the lugs 78. Thus, the structure of hinges 81 and 86 presents two opposite ratchet elements which operate together to continuously move belt 77 on rollers 75. The cut grass which moves onto the top of belt 77 will be carried laterally from the cutting area and will be thrown from the end of the belt through opening 92 in shield 20 by the rotational motion of the belt. It should be noted that the forward wheels 14 can be set behind the cutting bars 62 and 66 to prevent the mower from crushing grass which has not yet been cut.

Thus, from the foregoing it is seen that my device will accomplish at least all of its stated objectives.

Some changes may be made in the construction and arrangement of my mowing machine without departing from the real spirit and purpose of my invention, and it is my intention to cover by my claims, any modified forms of structure or use of mechanical equivalents which may be reasonably included within their scope.

I claim:

1. In a mowing machine, a wheel mounted frame, a first cutting bar slidably mounted to said frame, a second cutting bar slidably mounted to said frame and in sliding engagement with said first cutting bar, cutting elements on said first and second cutting bars, first and second reciprocating means on said frame, means connecting said first reciprocating means to said first cutting bar, means connecting said second reciprocating means to said second cutting bar, power means on said frame operatively connected to said reciprocating means whereby said cutting bars can both be slidably moved with respect to each other, roller elements on said frame adjacent said first and second cutting bars, a continuous belt mounted on said rollers, lugs on said belt, and ratchet means operatively secured to said cutting bars and in operative engagement with said lugs at times whereby the sliding movement of said bars can move said belt on said rollers to effect the removal of cut material on said belt away from said cutting bars.

2. In a mowing machine, a wheel mounted frame, two meshed horizontal gears rotatably mounted on said frame, one each of two elongated arms eccentrically secured to each of said gears, two bars slidably mounted in a transverse direction on said frame, one of said bars being connected to one each of said elongated arms, a first cutting bar having two ends secured to one of said bars by one of its ends and supported by said other bar at its other end, a second cutting bar having two ends secured to the other end of said bars by one of its ends and supported by the first of said two bars at its other end, said first and second cutting bars being in sliding engagement with the other, cutting elements on said first and second bars, power means on said frame for rotating said gears at times, roller elements on said frame adjacent said first and second cutting bars, a continuous belt mounted on said rollers, lugs on said belt, and ratchet means operatively secured to said cutting bars and in operative engagement with said lugs at times whereby the sliding movement of said bars can move said belt on said rollers to effect the removal of cut material on said belt away from said cutting bars.

References Cited in the file of this patent
UNITED STATES PATENTS

| | | |
|---|---|---|
| 527,697 | Kirsch | Oct. 16, 1894 |
| 786,202 | Gagne | Mar. 28, 1905 |
| 1,597,367 | McConnell | Aug. 24, 1926 |
| 1,647,867 | Hutsell | Nov. 1, 1927 |